United States Patent
Nomoto et al.

(10) Patent No.: US 10,815,036 B2
(45) Date of Patent: Oct. 27, 2020

(54) SLIDING LID CONSTRUCTION

(71) Applicant: TOYODA GOSEI CO., LTD., Kiyosu-shi, Aichi-ken (JP)

(72) Inventors: Naoki Nomoto, Kiyosu (JP); Hiroshi Zushi, Kiyosu (JP); Naoto Nishimura, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 117 days.

(21) Appl. No.: 16/273,308

(22) Filed: Feb. 12, 2019

(65) Prior Publication Data
US 2019/0276195 A1    Sep. 12, 2019

(30) Foreign Application Priority Data
Mar. 7, 2018   (JP) ................. 2018-041121

(51) Int. Cl.
*B65D 43/20* (2006.01)
*B60R 7/04* (2006.01)

(52) U.S. Cl.
CPC ............ *B65D 43/20* (2013.01); *B60R 7/04* (2013.01)

(58) Field of Classification Search
CPC ........ B65D 43/14; B65D 43/20; B65D 90/58; B60N 99/00; B60R 5/048; B60R 7/07; B60R 2022/1831
USPC ................................................. 206/335, 486
See application file for complete search history.

(56) References Cited

U.S. PATENT DOCUMENTS

| 6,540,098 B1* | 4/2003 | Jarvis ................. B65D 21/0219 220/254.1 |
| 8,939,491 B2* | 1/2015 | Gillis .................... B60N 3/101 296/24.34 |
| 10,070,935 B2* | 9/2018 | Waimberk ........... A61B 50/362 |

FOREIGN PATENT DOCUMENTS

JP          4050539 B2      2/2008

* cited by examiner

*Primary Examiner* — James N Smalley
*Assistant Examiner* — Madison L Poos
(74) *Attorney, Agent, or Firm* — Posz Law Group, PLC

(57) ABSTRACT

A sliding lid construction includes an upper-side lid member and lower-side lid member sliding relatively to one another, thereby changing their relative positional relationships at the open position and close position. At the open position, the upper-side lid member and lower-side lid member overlap one another in the up/down direction; at the close position, they cancel the overlap. The lower-side lid member includes a lower-side comb-shaped portion provided with protrusions and depressions on the top face in the width direction crossing the sliding direction perpendicularly, and a placement portion enabling a user to place an article thereon. The upper-side lid member includes an upper-side comb-shaped portion provided with protrusions and depressions on the bottom face in the width direction, and an inclined-face portion formed at the leading-side end in the sliding direction, and directed upward at an acute angle obliquely to the sliding direction.

12 Claims, 6 Drawing Sheets

SLIDING LID CONSTRUCTION

INCORPORATION BY REFERENCE

The present invention is based on Japanese Patent Application No. 2018-041121, filed on Mar. 7, 2018, the entire contents of which are incorporated herein by reference.

BACKGROUND OF THE INVENTION

1. Field of the Invention

The present invention relates to a sliding lid construction.

2. Description of the Related Art

Japanese Patent Publication Gazette No. 4050539, for instance, discloses a conventionally-known sliding lid construction for accommodator, such as console boxes that vehicles, and the like, have on-board. An accommodator comprises a box-shaped accommodator body, and a lid opening and closing an upper opening with which the accommodator body is provided. The lid includes a plurality of lid members capable of aligning in the front/rear direction of the accommodator. The lid members are capable of sliding relative to the accommodator in the front/rear direction, and one of the lid members is capable of overlapping the other one of the lid members upward or downward. The thus sliding and overlapping lid members allow realizing a sliding lid construction for the accommodator. Hereinafter, one of the lid members, which is located on a lower side when the accommodator opens during which an overlap occurs between the lid members in the up/down direction, will be referred to as a "lower-side lid member," and the other one of the lid members, which is located on an upper side at the time of the opening, will be referred to as an "upper-side lid member."

SUMMARY OF THE INVENTION

Incidentally, cellular phones, cards or coins, and the like, are often placed on the top face of the lower-side lid member under a closed condition where the upper-side lid member and lower-side lid member do not overlap one another in the up/down direction. On the other hand, the upper-side lid member is located above the lower-side lid member with a clearance provided between them under an opened condition where the lower-side lid member and upper-side lid member overlap one another in the up/down direction. In order to prevent the sliding lid construction from opening and opening faultily, it is needed to prohibit an article, which has been placed on the top face of the lower-side lid member at the time of closing, from being caught in the clearance at the time of opening.

However, the above conventionally-known sliding lid construction disclosed in the publication comprises the lid members each of which is formed in a shape of flat face, and whose faces (namely, the top face of the lower-side lid member and the bottom face of the upper-side lid member) opposing one another at the time of opening respectively make a plate-shaped face formed so as to spread horizontally. Consequently, the conventionally-known sliding lid construction is highly likely to open and close faultily, because it cannot effectively prohibit an article, which has been placed on the top face of the lower-side lid member at the time of closing, from being caught in the clearance at the time of opening.

The present invention has been developed in view of the issues like above. It is therefore an object of the present invention to provide a sliding lid construction that allows securely prohibiting an article, which has been placed on the top surface of the lower-side lid member, from being caught in a clearance occurring between the lower-side lid member and the upper-side lid member in the up/down direction.

For example, a sliding lid construction according to the present invention comprises:

an upper-side lid member and a lower-side lid member, at least one of the upper-side lid member and lower-side lid member sliding in a horizontal sliding direction to serve as a lid for accommodator, thereby turning a first relative positional relationship between the upper-side lid member and the lower-side lid member at an open position, at which the upper-side lid member and lower-side lid member overlap one another in an up/down direction, into a second relative positional relationship between the upper-side lid member and the lower-side lid member at a close position, at which the upper-side lid member and lower-side lid member separate away from one another horizontally, releasing the upper-side lid member and lower-side lid member from an overlap therebetween in the up/down direction, or vice versa;

the lower-side lid member including: a lower-side comb-shaped portion provided with lower-side upward protrusions protruding upward from a top face thereof and lower-side downward depressions depressing downward, the lower-side upward protrusions and lower-side downward depressions formed one after another in succession alternately in a horizontal width direction crossing the sliding direction perpendicularly; and a placement portion formed to be capable of placing an article on a top face thereof;

the upper-side lid member including: an upper-side comb-shaped portion capable of engaging with the lower-side comb-shaped portion, and provided with upper-side downward protrusions protruding downward from a bottom face thereof and upper-side upward depressions depressing upward, the upper-side downward protrusions and upper-side upward depressions formed one after another in succession alternately in the horizontal width direction; and an inclined-face portion formed at one of opposite ends thereof in the sliding direction, and having a face formed at an acute angle so as to be directed upward obliquely to the sliding direction.

The thus constructed sliding lid construction according to the present invention comprises the upper-side lid member including the inclined-face portion that makes likely an object, which is placed on the placement portion of the lower-side lid member, to get onto the top face of the upper-side lid member when the object arrives relatively at one of the opposite ends (i.e., the leading end) of the upper-side lid member in the sliding direction in the course of sliding the upper-side lid member and lower-side lid member to overlap one another in the up/down direction. Moreover, each of the upper-side lid member and lower-side lid member includes the comb-shaped portion whose protrusions and depressions are formed one after another in succession alternately in the width direction, and the two comb-shaped portions which engage with one another. Accordingly, the object, which is placed on the placement portion in the top face of the lower-side lid member, is likely to come in contact with an end face of the protrusions in the comb-shaped portion of the upper-side lid member when the object arrives relatively at one of the opposite ends (i.e., the leading end) of the upper-side lid member in the sliding direction. Consequently, the object is less likely to get into any clearance occurring between the upper-side lid member and the lower-side lid member. Therefore, the present sliding lid construction allows securely prohibiting the object placed on the top face of the lower-side lid member from being caught in any clearance occurring between the upper-side lid member and the lower-side lid member in the up/down direction.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

Hereinafter, a specific embodiment mode of a sliding lid construction according to the present invention will be described using the drawings.

Figure 1:
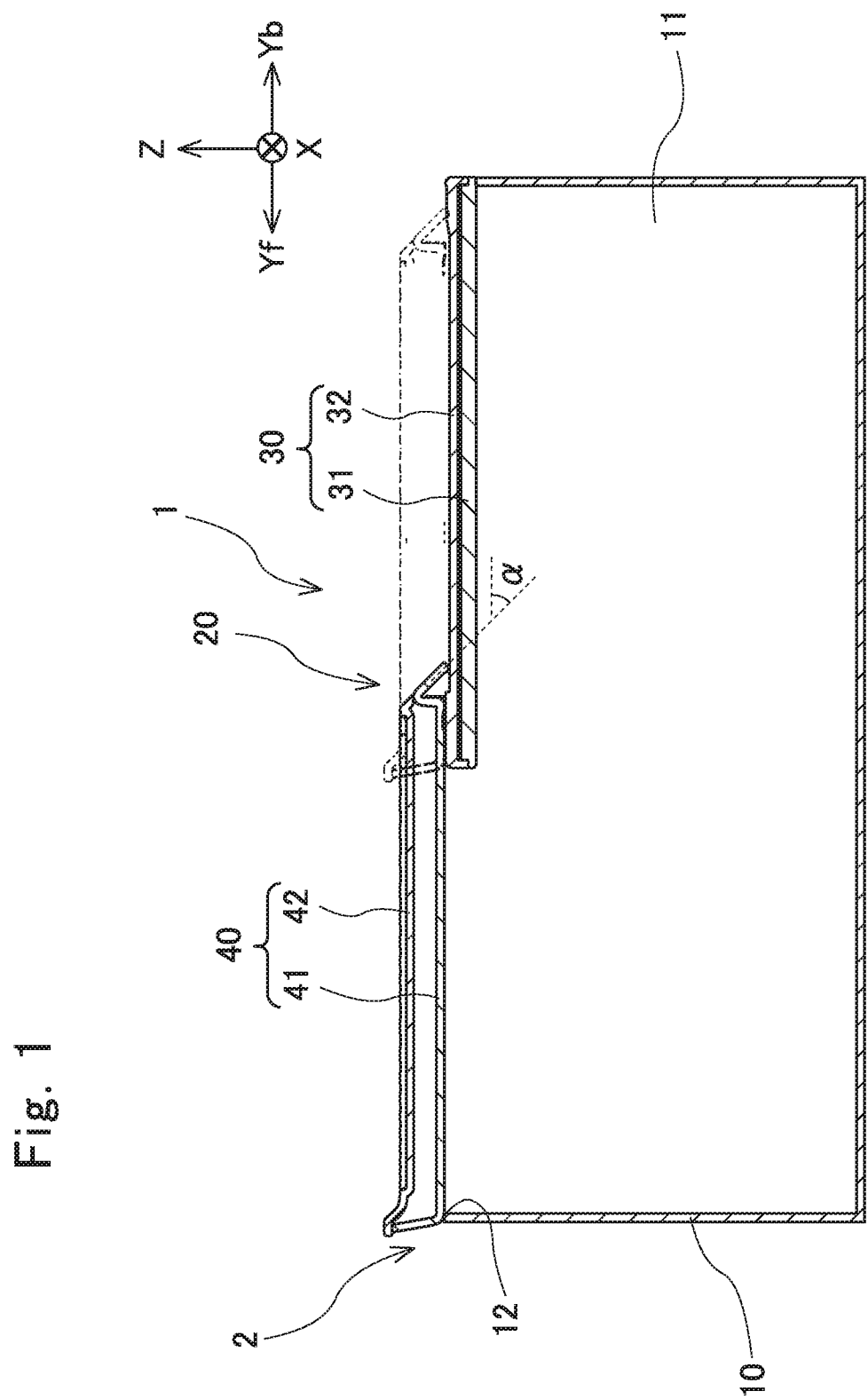
FIG. 1 is a cross-sectional view of an accommodator to which a sliding lid construction according to Embodiment of the present invention is applied.

A sliding lid construction 1 according to Embodiment of the present invention is a structure applied to an accommodator 2, such as a center console box arranged inside a vehicular passenger room, for instance. As illustrated in FIG. 1, the accommodator 2 comprises an accommodator body 10, and a lid 20.

The accommodator body 10, which is formed in a shape of box such as a rectangular parallelepiped, is molded of a resinous raw material, for instance. The accommodator body 10, which extends in the front/rear direction of a vehicle, for instance, has an inner space 11 for accommodating articles. The inner space 11, which spreads over the accommodator body 10 substantially entirely, has an upper opening 12 that opens in the top face. The upper opening 12, which is formed in a shape of quadrangle, spreads substantially horizontally. The inner space 11 is capable of communicating with the outside through the upper opening 12.

Figure 2:
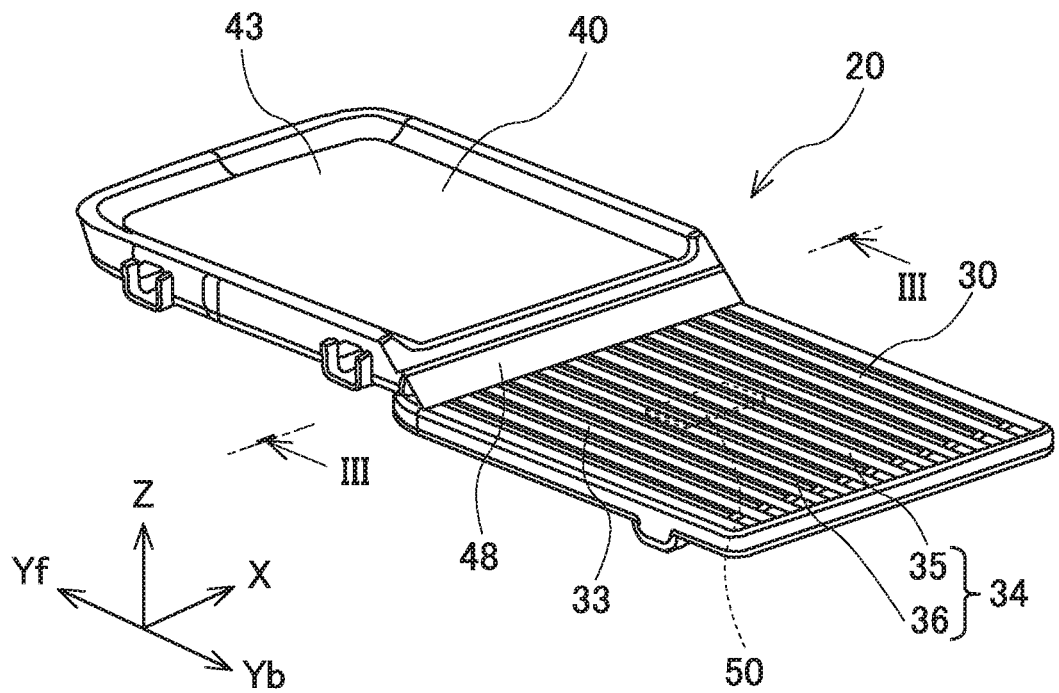
FIG. 2 is an exploded perspective view of a lid according to Embodiment with which the accommodator is equipped.

The lid 20 is an opening and closing member that opens and closes the upper opening 12 in the accommodator body 10. Moreover, the lid 20 is a tray-shaped member allowing a user to place articles, such as cellular phones, cards and coins, on the top face. As illustrated in FIG. 2, the lid 20, which is formed in a shape of quadrangular plate virtually, is arranged substantially horizontally. The lid 20 includes lid members (30, 40) divided into two. The lid members (30, 40), which are disposed at the top of the accommodator body 10, are arranged so as to close the inner space 11 at the top.

The lid members (30, 40) have such relationships with one another that at least one of the lid members (30, 40), which slides in a horizontal direction "Y," changes their relative positional relations. Note hereinafter that the lid member 30 is installed fixedly to the top of the accommodator body 10, and that the lid member 40 slides relative to the fixed lid member 30 and to the accommodator body 10. Moreover, in addition to hereinafter referring to the horizontal direction "Y" as a sliding direction "Y," a horizontal direction crossing the sliding direction "Y" perpendicularly will be referred to as a width direction "X," and another direction crossing both of the sliding direction "Y" and width direction "X" perpendicularly will be referred to as an up/down direction "Z," respectively.

Figure 4:
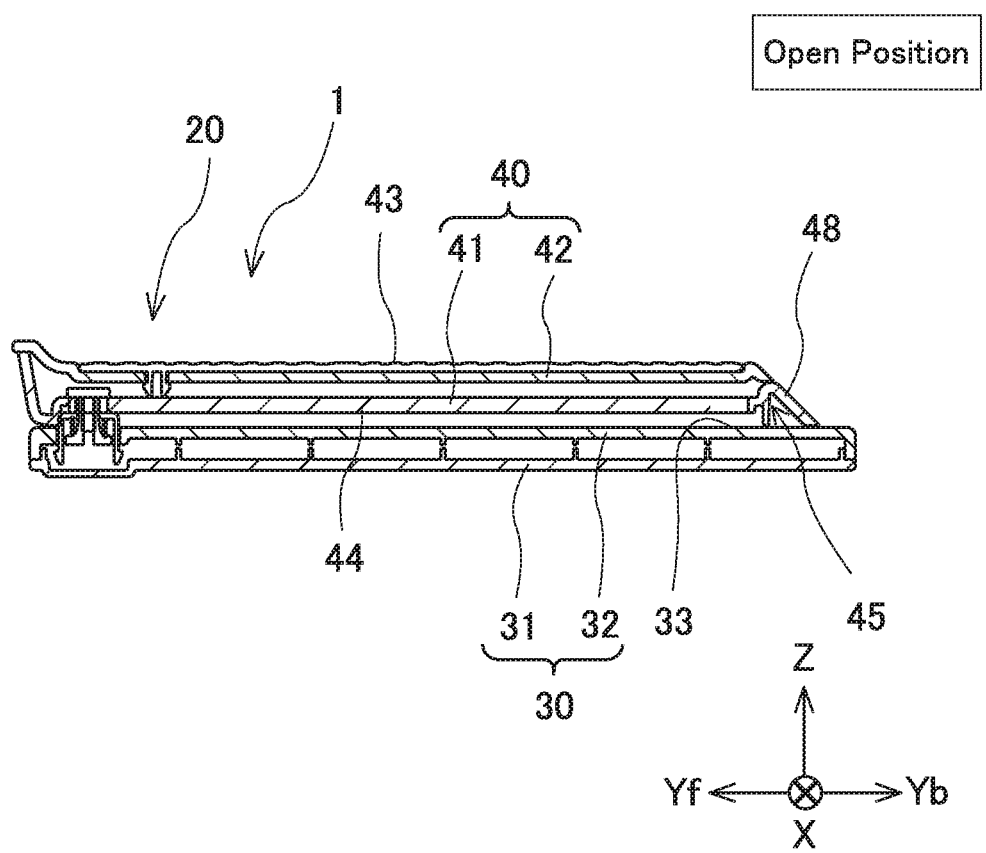
FIG. 4 is a cross-sectional view of the lid according to Embodiment at the open position when viewed sideways.
Figure 5:
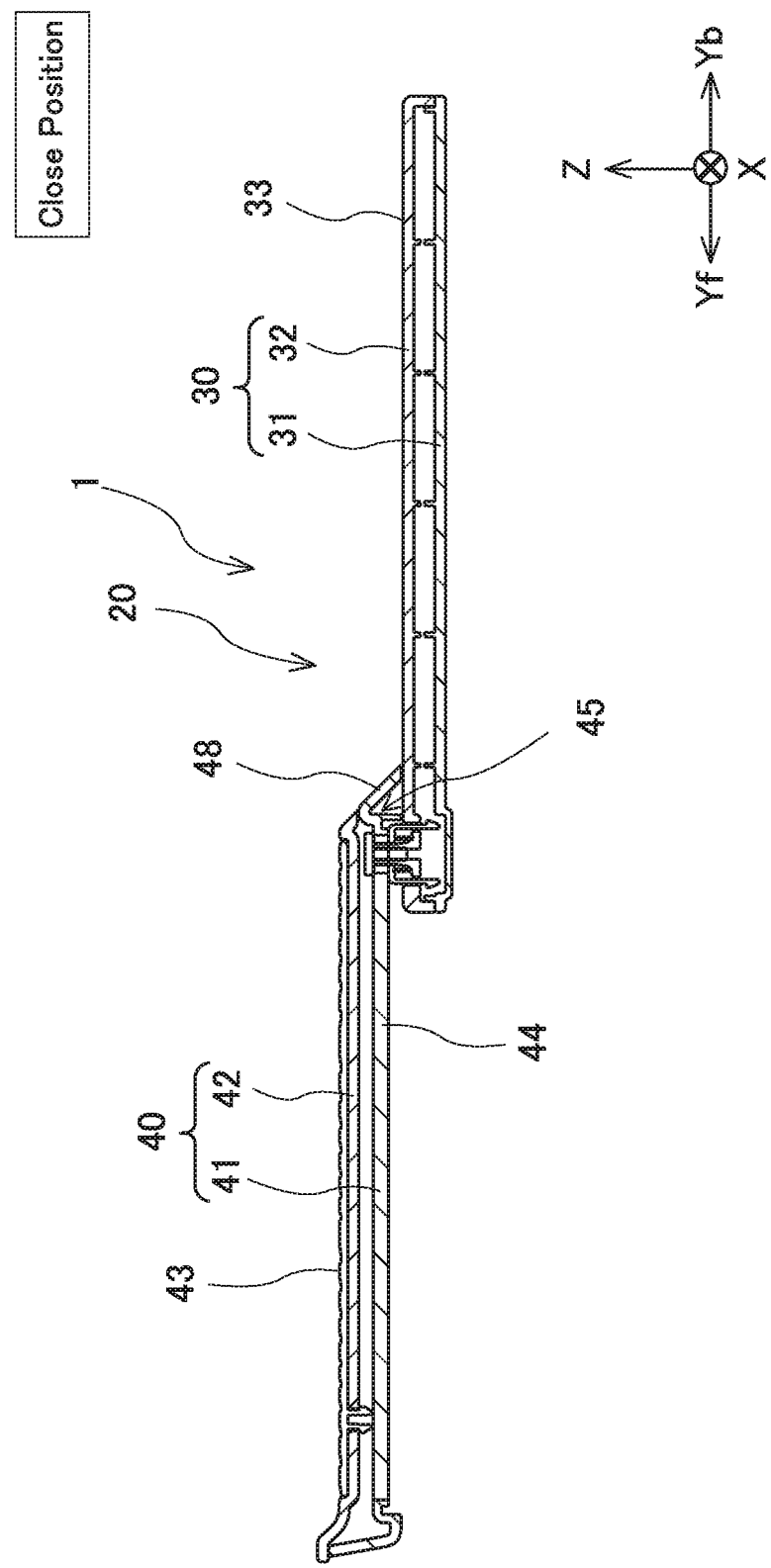
FIG. 5 is a cross-sectional view of the lid according to Embodiment at the close position when viewed sideways.

The accommodator 2 involves two conditions, namely, a first condition where the upper opening 12 in the accommodator body 10 is opened when the two lid members (30, 40) overlap one another in the up/down direction "Z" as shown in FIG. 4; and a second condition where the upper opening 12 in the accommodator body 10 is closed when the two lid members (30, 40) cancel the overlap in the up/down direction "Z" as shown in FIG. 5. Hereinafter, a first position at which the lid members (30, 40) overlap one another in the up/down direction "Z" will be referred to as an open position in the present sliding construction 1 according to Embodiment; and a second position at which the lid members (30, 40) separate away from one another in the sliding direction "Y" and at which the lid members (30, 40) cancel the overlap in the up/down direction "Z" will be referred to as a close position in the present sliding construction 1, respectively. Thus, the lid members (30, 40) are able to change their relative positional relationships between the open position and the close position.

Each of the lid members (30, 40), which are formed in a shape of quadrangular plate virtually, is arranged substantially horizontally. The respective lid members (30, 40), which are molded of resin or the like, are arranged so as to locate the lid member 30 down below; and so as to locate the lid member 40 up above relative to the below-located lid member 30; under such a condition as their horizontal faces overlap one another substantially over the entire area in the up/down direction "Z" at the open position in the present sliding lid construction 1 according to Embodiment. Note that the lid members (30, 40) are satisfactorily arranged so that the horizontal faces overlap one another just partially at their opposite ends at the close position in the present sliding lid device 1. Hereinafter, the lid member 30, and the lid member 40 will be referred to as a lower-side lid member 30, and an upper-side lid member 40, respectively, whenever the references are appropriate. Moreover, the upper-side lid member 40 is located on a vehicular front side relative to the lower-side lid member 30 at the close position in the present sliding lid construction 1.

Figure 3:
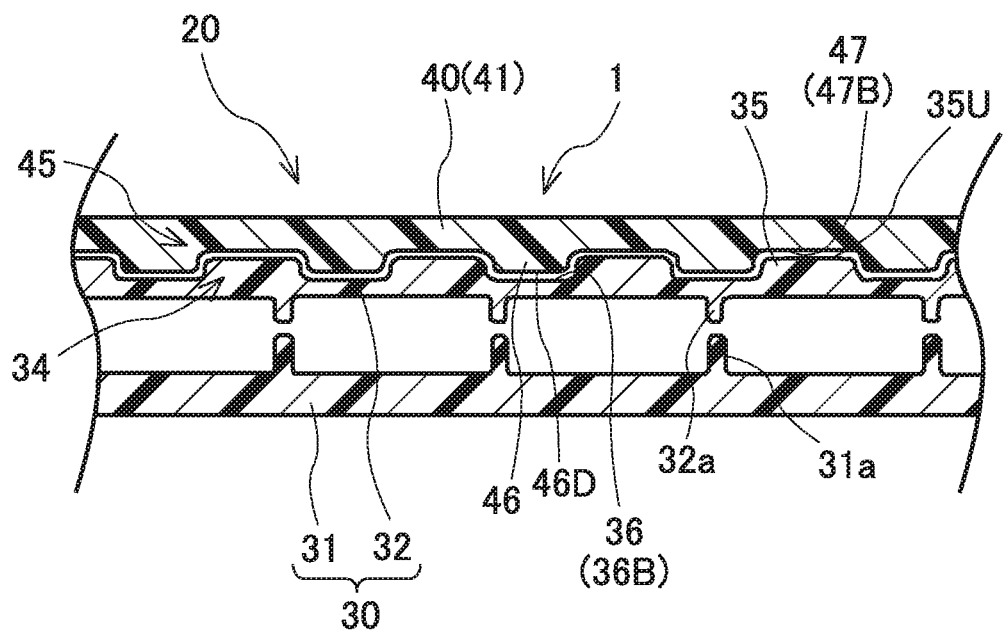
FIG. 3 is a cross-sectional view of the lid according to Embodiment when being cut in the direction of arrows "III"-"III" shown in FIG. 2.

The lower-side lid member 30 includes a lower component 31, and an upper component 32. Each of the lower component 31 and upper component 32 is formed in a shape of plate virtually. As illustrated in FIGS. 1, 3, 4 and 5, the lower-side lid member 30 has such a construction that the lower component 31 and upper component 32 are fixed one another by fitting, or the like, while their plate faces are opposed to one another with a clearance provided between them. As illustrated in FIG. 3, each of the lower component 31 and upper component 32 has a plurality of ribs (31a, 32a) for reinforcement. The ribs 31a are provided on a face in the lower component 31 opposing to the upper component 32, namely, on the top face, so as to protrude perpendicularly, namely, upward, toward the side of the upper component 32. Meanwhile, the ribs 32a are provided on a face in the upper component 32 opposing to the lower component 31, namely, on the bottom face, so as to protrude perpendicularly, namely, downward, toward the side of the lower component 31.

The lower-side lid member 30, specifically, the lower component 31, is formed so that its bottom face makes a substantially horizontal flat face. Moreover, the lower-side lid member 30, specifically, the upper component 32, includes the placement portion 33 provided on the top face. The placement portion 33 is a site formed so as to enable a user to place articles with a predetermined size or more, such as cellular phones, wallets, cards and coins, on it. The articles will be hereinafter referred to as an object 50 collectively. The placement portion 33 is formed so as to roughly make a substantially horizontal face as a whole. As illustrated in FIG. 2, the lower-side lid member 30, specifically, the upper component 32, further includes a comb-shaped portion 34 provided on the top face. The comb-shaped portion 34 will be hereinafter referred to as a "lower-side comb-shaped portion" 34 distinctly.

The lower-side comb-shaped portion 34 is a site that is provided with irregularities formed one after another in succession in the width direction "X" on the tope face of the upper component 32 to undulate in the up/down direction "Z." The lower-side comb-shaped portion 34 extends between a vehicular front end and a vehicular rear end in the upper component 32 in the sliding direction "Y" substantially over the entire area in the sliding direction "Y" toward the vehicular-front-end side as well as in the opposite sliding direction "Y" toward the vehicular-rear-end side. The two sliding directions "Y" will be hereinafter referred to as a "forward sliding direction" "Yf," and a "backward sliding direction" "Yb," distinctly. That is, the lower-side lid member 30 includes the upper component 32 with a configuration in which the irregularities undulating in the up/down direction "Z" arise one after another in succession in the width direction "X."

Figure 6:
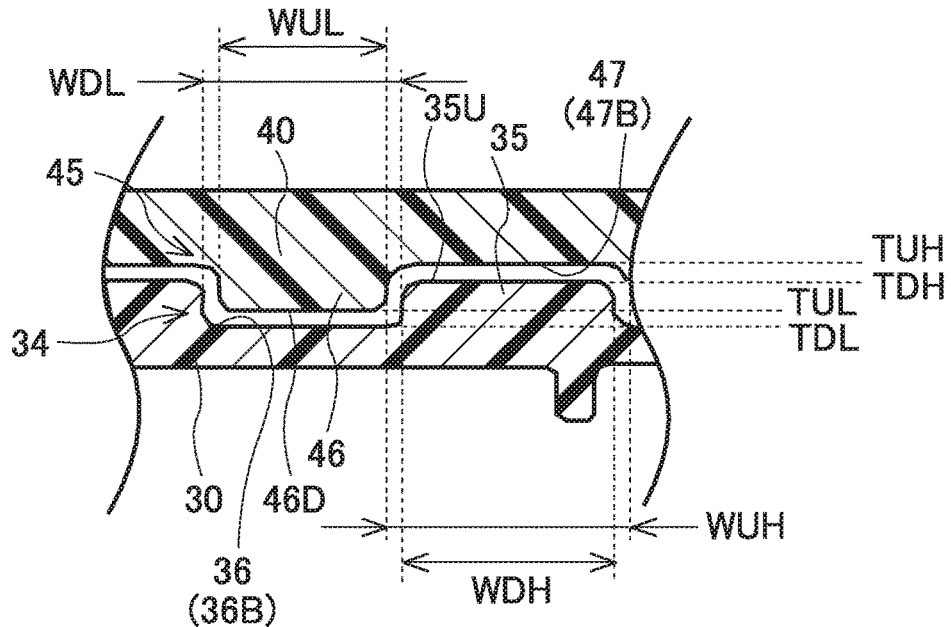
FIG. 6 is an enlarged cross-sectional view of the present sliding lid construction according to Embodiment.
Figure 7:
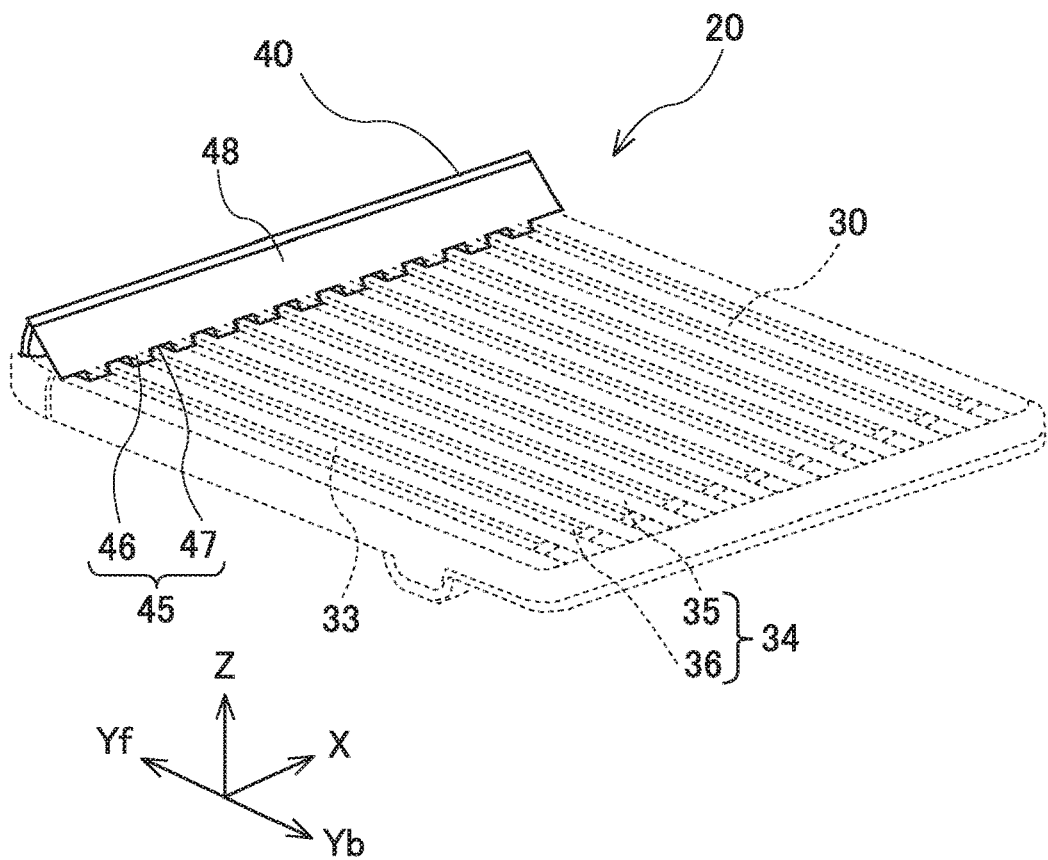
FIG. 7 is a perspective view of a lid with which an accommodator is equipped, and to which the present sliding lid construction according to First Modified Embodiment is applied.

The lower-side comb-shaped portion 34 includes protrusions 35, and depressions 36. As illustrated in FIG. 6, the protrusions 35 are provided so as to protrude upward relative to the depressions 36. The protrusions 35 have an upward-directed top end face 35U making a substantially horizontal face, respectively. The depressions 36 are provided so as to depress downward relative to the protrusions 35. The depressions 36 have a downward-directed bottom end face 36B making a substantially horizontal face, respectively.

The protrusions 35, and the depressions 36 are formed one after another in succession alternately in the width direction "X." Each of the protrusions 35 and depressions 36 extends linearly in the sliding direction "Y." The protrusions 35 and depressions 36 lining up alternately in the width direction "X" are provided in large quantities, respectively. For example, the number of the depressions 36 is 10. The multiple protrusions 35 have the top end faces 35U made substantially flush to each other, because the top end faces 35U are located at a substantially identical height to each other. The top end faces 35U of the multiple protrusions 35, which line up in the width direction "X" while interposing the depressions 36 between them, form the above-described placement portion 35. Moreover, the multiple depressions 36 have the bottom end faces 36B located at a substantially identical height to each other.

The upper-side member 40 includes a lower component 41, and an upper component 42. Each of the lower component 41 and upper component 42 is formed in a shape of plate virtually. As illustrated in FIGS. 1, 4 and 5, the upper-side lid member 40 has such a construction that the lower component 41 and upper component 42 are fixed one another by fitting, or the like, while their plate faces are opposed to one another with a clearance provided between them. Note that each of the lower component 41 and upper component 42 also satisfactorily has ribs for reinforcement.

The upper-side lid member 40, specifically, the upper component 42, is formed so that its top face makes a substantially horizontal flat face. Moreover, the upper component 42 includes the placement portion 43 provided on the top face, as shown in FIG. 2. The placement portion 43 is a site making a substantially horizontal flat face over the entire area. Note that the placement portion 43 is satisfactorily formed in a shape of flat plate, or in a shape of net, to enable a user to place the above-described object 50, or other articles whose size is smaller than that of the object 50, on it. In addition, the upper component 42 adequately has a frame-shaped section so as to make objects placed on the placement portion 43 less likely to fly out to the outside. As illustrated in FIGS. 4 and 5, the upper-side lid member 40, specifically, the lower component 41, further includes a horizontal base portion 44, and a comb-shaped portion 45 provided on the bottom face of the horizontal base portion 44. The comb-shaped portion 45 will be hereinafter referred to as an "upper-side comb-shaped portion" 45 distinctly.

The horizontal base portion 44 is a horizontally-spreading site making a substrate of the upper-side lid member 40, as shown in FIG. 4. The upper-side comb-shaped portion 45 is provided at the leading or free end of the bottom face of the horizontal base portion 44 on the leading side in the backward sliding direction "Yb." That is, the upper-side comb-shaped portion 45 makes a site in which irregularities undulating in the up/down direction "Z" are formed one after another in succession in the width direction "X" in the bottom face of the horizontal base portion 44 on the leading side in the backward sliding direction "Yb." In other words, the upper-side lid member 40 includes the lower component 41 with a configuration in which the irregularities undulating in the up/down direction "Z" arise one after another in succession in the width direction "X" at the leading or free end of the horizontal base portion 44 on the leading side in the backward sliding direction "Yb."

As illustrated in FIG. 3, the upper-side comb-shaped portion 45 is a site paired with the lower-side comb-shaped portion 34. The upper-side comb-shaped portion 45 is capable of engaging with the lower-side comb-shaped portion 34, because it has a configuration coinciding with that of the lower-side comb-shaped portion 34. The upper-side comb-shaped portion 45 has protrusions 46, and depressions 47. The protrusions 46, which are provided so as to protrude downward relative to the depressions 47, are formed so as to be capable of engaging with the depressions 36 of the lower-side comb-shaped portion 34. The protrusions 46 have downward-directed bottom-end faces 46D that make a substantially horizontal face, respectively. The depressions 47, which are provided so as to depress upward relative to the protrusions 46, are formed so as to be capable of engaging with the protrusions 35 of the lower-side comb-shaped portion 34. The depressions 47 have downward-directed bottom end faces 47B that make a substantially horizontal face, respectively. Note that the depressions 47 also satisfactorily make the bottom face of the horizontal base portion 44.

The protrusions 46, and the depressions 47 are formed one after another in succession alternately in the width direction "X." Each of the protrusions 46 and depressions 47 extends linearly in the sliding direction "Y." The protrusions 46 and depressions 47 lining up alternately in the width direction "X" are provided in large quantities, respectively. For example, the number of the protrusions 46 is 10. The protrusions 46 are paired with the depressions 36 of the lower-side lid member 30. Likewise, the depressions 47 are paired with the protrusions 35 of the lower-side lid member 30.

Note that the present sliding lid construction 1 according to Embodiment satisfactorily further comprises a stopper mechanism for inhibiting the upper-side lid member 40 from sliding from the close position relative to the lower-side lid member 30 in the forward sliding direction "Yf." For example, the stopper mechanism involves a side wall that is erected upward relative to the depressions 36 of the lower-side lid member 30 on the leading-end side in the forward sliding direction "Yf," and which comes in contact with the end faces in the protrusions 46 of the upper-side lid member 40 when the upper-side lid member 40 tries to slide relative to the lower-side lid member 30 in the forward sliding direction "Yf," whereby inhibiting the sliding of the upper-side lid member 40 in the direction. The stopper mechanism prohibits the upper-side lid member 40 from coming off from the lower-side lid member 30 to disintegrate in the forward sliding "Yf" when a user operates the present lid construction 1 to close it to the close position.

The upper-side lid member 40 has the protrusions 46 in a quantity coinciding with that of the depressions 36 that the lower-lid member 30 has. Moreover, the upper-side lid member 40 has the depressions 47 in a quantity coinciding with that of the protrusions 35 that the lower-lid member 30 has. The bottom end faces 46D of the multiple protrusions 46 are located at a substantially identical height to each other, because they are made substantially flush to each other. Meanwhile, the bottom faces 47B of the multiple depressions 47 are located at a substantially identical height to each other that is comparative to the flushness between the top end faces 35U of the protrusions 35 in the lower-side lid member 30.

The present sliding lid construction 1 according to Embodiment involves an open position arranging the upper-sidle lid member 40 so as to be located above the lower-side lid member 30. As illustrated in FIG. 6, the upper-side lid member 40 has the protrusions 46 whose bottom end face 46D is present at a height position "TUL"; the lower-side lid member 30 has the depressions 36 whose bottom face 36B is present at a height position "TDL"; and the height position "TUL" is above the height position "TDL." Moreover, the upper-side lid member 40 has the depressions 47 whose bottom face 47B is present at a height position "TUH"; the lower-side lid member 30 has the protrusions 35 whose upper end face 35U is present at a height position "TDH"; and the height position "TUH" is above the height position "TDH." In addition, the lower-side lid member 30 has the protrusions 35 whose top end face 35U is present at a height position "TDH" (i.e., a height position at with the placement portion 33 is present); the upper-side lid member 40 has the protrusion 46 whose bottom end face 46D is present at a height position "TUL"; and the height position "TDH" is above the height position "TUL."

In order to prohibit the object 50 placed on the placement portion 33 from falling down to be stuck into the grooves in the depressions 36, the lower-side lid member 30 includes the lower-side comb-shaped portion 34 each of whose depressions 36 has a width dimension "WDL" in the width direction "X" that is set up to be smaller than a minimum width dimension that the object 50 has in the direction. Moreover, in order to make the lower-side lid member 30 and upper-side lid member 40 slidable one another in the sliding direction "Y," the width dimension "WDL" of the depressions 36 is set up to be slightly larger than a dimension "WUL" that the protrusions 46 have in the upper-side comb-shaped portion 45 of the upper-side lid member 40 in the width direction "X." Specifically, a desirable width dimension "WDL" is from 4 mm to 12 mm, and a more desirable width dimension "WDL" is from 5 mm to 8 mm.

Moreover, in order to prohibit the object 50 placed on the placement portion 33 from passing through the depressions 47 in the sliding direction "Y" (namely, passing in the sliding direction "Y" through the clearances between the protrusions 47 neighboring each other in the width direction "X") to go down below the upper-side lid member 40, the upper-side lid member 40 includes the upper-side comb-shaped portion 45 each of whose depressions 47 has a width dimension "WUH" in the width direction "X" that is set up to be smaller than a minimum width dimension that the object 50 has in the direction. Moreover, in order to make the upper-side lid member 40 and lower-side lid member 30 slidable one another in the sliding direction "Y," the width dimension "WUH" of the depressions 47 is set up to be slightly larger than a dimension "WDH" that the protrusions 35 have in the lower-side comb-shaped portion 35 of the lower-side lid member 30 in the width direction "X." Specifically, a desirable width dimension "WUH" is from 4 mm to 12 mm, and a more desirable width dimension "WUH" is from 5 mm to 8 mm.

The upper-side lid member 40, specifically, the lower component 41, further includes an inclined-face portion 48 inclined to the sliding direction "Y." As can be seen from FIGS. 1 and 2, the upper-side lid member 40 has a leading side, and a trailing side following the leading side in the backward sliding direction "Yb." As illustrated in FIGS. 4 and 5, the inclined-face portion 48 is provided on the leading side in the backward sliding direction "Yb," and the upper-side comb-shaped portion 45 is provided on the trailing side in the direction. For example, the inclined-face portion 48 is located at a position on the leading side that is present on a more leading-end side, or on a freer-end side, in the backward sliding direction "Yb" than the leading end at which the upper-side comb-shaped portion 45 is located on the trailing side in the direction, specifically, than the trailing-side leading-end position at which the leading or free end of the upper-side comb-shaped portion 45 is located in the backward sliding direction "Yb." As illustrated in FIGS. 4 and 5, the inclined-face portion 48, which constitutes the lower component 41, is molded integrally with the horizontal base portion 44 and upper-side comb-shaped portion 45. Note however that the inclined-face portion 48 is satisfactorily molded integrally with the placement portion 43 of the upper component 42 as one of the constituents of the upper component 42.

The inclined-face portion 48 has a face with an acute angle (i.e., the angle "$\alpha$" shown in FIG. 1 ($0<$"$\alpha$"$<90$ degrees)) when viewed in the width direction "X" so as to direct the inclined-face portion 48 upward obliquely to the backward sliding direction "Yb." That is, the inclined-face portion 48 is formed so as to occupy positions heightening gradually from an opposite side in the backward sliding direction "Yb" to the other opposite side in the forward sliding direction "Yf." Moreover, the inclined-face portion 48 is provided over the entire area in the upper-side lid member 40 in the width direction "X."

Note that the angle "α," which the inclined-face portion 48 makes to the horizontal, is satisfactorily set up so as to make the object 50 placed on the placement portion 33 of the lower-side lid member 30 transferable onto the placement portion 43 without being hooked to or captured on the end face on the leading or free side of the upper-side lid member 40 in the backward sliding direction "Yb." Specifically, a desirable angle "α" is from 30 to 60 degrees, and a more desirable angle "α" is from 40 to 50 degrees. Moreover, a height position at which the bottom end of the inclined-face portion 48 is present adequately coincides with a height position at which the bottom face 47B of the depressions 47 is present, as far as enabling the object 50 placed on the placement portion 33 of the lower-side lid member 30 to transfer onto the placement portion 43 without being hooked to or captured on the end face on the leading or free side of the upper-side lid member 40 in the backward sliding direction "Yb." Alternatively, the height position at which the bottom end of the inclined-face portion 48 is present is satisfactorily located above a height position at which the top end face 35U in the protrusions 35 in the lower-side lid member 30 is present, namely, a height position at which the placement portion 33 is present.

The accommodator 2 comprising the above-described present sliding construction 1 according to Embodiment involves a close position canceling the overlap between the lower-side lid member 30 and the upper-side lid member 40 in the up/down direction "Z" so that the horizontal positions of the two lid members (30, 40) are displaced from one another, wherein the upper-side lid member 40 includes the upper-side comb-shaped portion 45 located at the leading or free end of the lower-side lid member 30 in the forward sliding direction "Yf" while engaging the upper-side comb-shaped portion 45 with the lower-side comb-shaped portion 34 of the lower-side lid member 30, as shown in FIG. 5. The upper-side lid member 40, which is operated by a user, slides in the backward sliding direction "Yb" from the close position relative to the lower-side lid member 30. Accordingly, the upper-side comb-shaped portion 45 with which the upper-side lid member 40 is provided moves linearly along the lower-side lid member 30 in the backward sliding direction "Yb" while maintaining the engagement with the lower-side comb-shaped portion 34 with which the lower-side lid member 30 is provided. Consequently, the upper-side lid member 40, whose upper-side comb-shaped portion 45 arrives at the leading-side end of the lower-side lid member 30 in the backward sliding direction "Yb" while maintaining the engagement with the lower-side comb-shaped portion 34 of the lower-side lid member 30, realizes the open position where the substantially entire area of the horizontal face in the lower-side lid member 30 and that in the upper-side lid member 40 overlap one another, as shown in FIG. 4.

Thus, the present sliding construction 1 according to Embodiment comprises the upper-side lid member 40 sliding back and forth in the sliding direction "Y" to open and close the upper opening 12 in the accommodator body 10. Moreover, the present sliding construction 1 opens and closes the upper opening 12 under the condition that the lower-side comb-shaped portion 34 of the lower-side lid member 30 engages with the upper-side comb-shaped portion 45 of the upper-side lid member 40. The engagement results from an engagement between the protrusions 35 provided in the lower-side lid member 30 and the depressions 47 provided in the upper-side lid member 40, and from another engagement between the depressions 36 provided in the lower-side lid member 30 and the protrusions 46 provided in the upper-side lid member 40.

As described above, the lower-side comb-shaped portion 34 includes the depressions 36 whose width dimension "WDL" in the width direction "X" is smaller than the minimum width dimension of the object 50. Consequently, the lower-side lid member 30 allows prohibiting the object 50, which is placed on the top face in the placement portion 33 of the lower-side lid member 30, from falling down into the depressions 36, which exist between the two protrusions 35 neighboring in the width direction "X" of the lower-side lid member 30, to be caught or stuck in them.

Moreover, if the upper-side lid member 40 were to slide in the backward sliding direction "Yb" under the condition that the object 50 is placed on the placement portion 33 of the lower-side lid member 30, the object 50 might be likely to make contact with the leading-side end of the upper-side lid member 40 in the backward sliding direction "Yb" to hinder the upper-side lid member 40 sliding in the direction.

In order to deal with the above possibility, the present sliding lid construction 1 according to Embodiment comprises the upper-side lid member 40 including the inclined-face portion 48 provided at the leading-side end face in the backward sliding direction "Yb." The inclined-face portion 48 is formed to have an acute angle when viewed in the width direction "X" so that it is directed upward obliquely to the backward sliding direction "Yb," and is formed so as to occupy gradually heightening positions from the leading-end side end in the backward sliding direction "Yb" to the trailing-end side in the direction (i.e., the leading-end side in the forward sliding direction "Yf"). Consequently, the object 50, which is placed on the placement portion 33 of the lower-side lid member 30, is likely to get onto the inclined-face portion 48 when the object 50 arrives relatively at the leading-side end of the upper-side lid member 40 in the backward sliding direction "Yb" during the sliding of the upper-side lid member 40 in the backward sliding direction "Yb" (i.e., during the opening operation of the present sliding lid construction 1). Therefore, the inclined-face portion 48 allows inhibiting the object 50 from being hooked to or captured on the leading-side end of the upper-side lid member 40 in the backward sliding direction "Yb"; and permits transferring the object 50 from the placement portion 33 of the lower-side lid member 30 to the placement portion 43 of the upper-side lid member 40; during the opening operation of the present sliding construction 1.

Moreover, if the object 50 were not to get onto the inclined-face portion 48 of the upper-side lid member 40, the object 50, which does not get onto the inclined-face portion 48, might go into a clearance occurring in the up/down direction "Z" between the bottom end in the inclined-face portion 48 of the upper-side lid member 40 and the placement portion 33 of the lower-side lid member 30 during the sliding of the upper-side lid member 40 in the backward sliding direction "Yb." On this occasion, the object 50 is likely to be put or held between the clearance occurring in the up/down direction "Z" between the upper-side lid member 40 and the lower-side lid member 30, or is likely to make its way further into a space occurring in the up/down direction "Z" between them.

In order to deal with the above possibility, the present sliding lid construction 1 according to Embodiment comprises the upper-side lid member 40 including the upper-side comb-shaped portion 45 provided on the side nearer to the trailing-side end in the backward sliding direction "Yb" (or nearer to the leading-side end in the forward sliding direction "Yf") than the leading-side end position in the backward sliding direction "Yb" at which the inclined-face portion 48 is provided. Moreover, the placement portion 33 of the lower-side lid member 30 has the height position "TDH" that is above the height position "TUL" that the protrusions 46 have at the bottom end face 46D in the upper-side comb-shaped portion 45 of the upper-side lid member 40. In addition, the width dimension between protrusions 46 in the width direction "X" is smaller than the minimum width dimension of the object 50, because the depressions 47 provided in the upper-side lid member 40 have the width dimension "WUH" that is smaller than the minimum width dimension of the object 50.

Hence, even if the object 50 is formed to have a thickness that makes it possible to go into the clearance between the upper-side lid member 40 and the lower-side lid member 30, the object 50 placed on the placement portion 33 of the lower-side lid member 30 surely comes in contact with the leading-end face that the protrusions 46 have in the upper-side comb-shaped portion 45 of the upper-side lid member 40 in the backward sliding direction "Yb" when the object 50 arrives relatively at the leading-side end of the upper-side lid member 40 in the direction. Therefore, the upper-side comb-shaped portion 45 allows securely prohibiting the object 50 placed on the placement portion 33 of the lower-side lid member 30 from being put or held in the clearance occurring between the upper-side lid member 40 and the lower-side lid member 30 in the up/down direction "Z"; and accordingly permits securely prohibiting the object 50 from making its way further into any space occurring between them in the up/down direction "Z"; even when the object 50 does not get onto the inclined-face portion 48 of the upper-side lid member 40 during the opening operation of the present sliding lid construction 1 according to Embodiment. Thus, the upper-side lid member 40 including the comb-shaped portion 45 allows preventing the present sliding lid construction 1 from operating faultily during the opening operation.

Note that the major constituents of the present sliding lid construction 1 according to Embodiment, namely, the protrusions 35 in the lower-side comb-shaped portion 34 of the lower-side lid member 30, the depressions 36 in the lower-side comb-shaped portion 34 of the lower-side lid member 30, the protrusions 46 in the upper-side comb-shaped portion 45 of the upper-side lid member 40, and the depressions 47 in the upper-side comb-shaped portion 45 of the upper-side lid member 40 are respectively equivalent to the claimed "lower-side upward protrusions," the claimed "lower-side downward depressions," the claimed "upper-side downward protrusions," and the claimed "upper-side upward depressions."

Incidentally, the above-described present sliding lid device 1 according to Embodiment comprises the upper-side lid member 40 including the upper-side comb-shaped portion 45 provided partially on the bottom face in the horizontal base 44 that makes the substrate of the upper-side lid member 40 spreading horizontally, specifically, only at the end of the horizontal base 44 on the leading side in the backward sliding direction "Yb." However, the present invention is not limited to the thus constructed present sliding lid construction 1 at all. For example, in the same manner as the lower-side comb-shaped portion 34 of the lower-side lid member 30, the upper-side lid member 40 satisfactorily includes the upper-side comb-shaped portion formed over the substantially entire area in the bottom face in the horizontal base 44, and provided with the protrusions 46 and depressions 47 each of which is formed so as to linearly extend in the sliding direction "Y."

Note that the present sliding lid construction 1 according to above-described First Modified Embodiment satisfactorily includes the lower-side lid member 30 whose depressions 36 have a space formed so as to directly communicate with the outside (or the inner space 11 in the accommodator body 10) on the leading side in the forward sliding direction "Yf." However, it is unnecessary for the lower-side lid member 30 to have a side wall at the end on the leading side in the forward sliding direction "Yf," with side wall which the upper-side comb-shaped portion 45 of the upper-side lid member 40 comes in contact at the end face in the protrusions 46 directed in the forward sliding direction "Yf." It is necessary for the present sliding lid construction 1 according to First Modified Embodiment thus constructed to further comprise a stopper mechanism for inhibiting the upper-side lid member 40 from sliding from the close position in the forward sliding direction "Yf" relative to the lower-side lid member 30.

Figure 8:
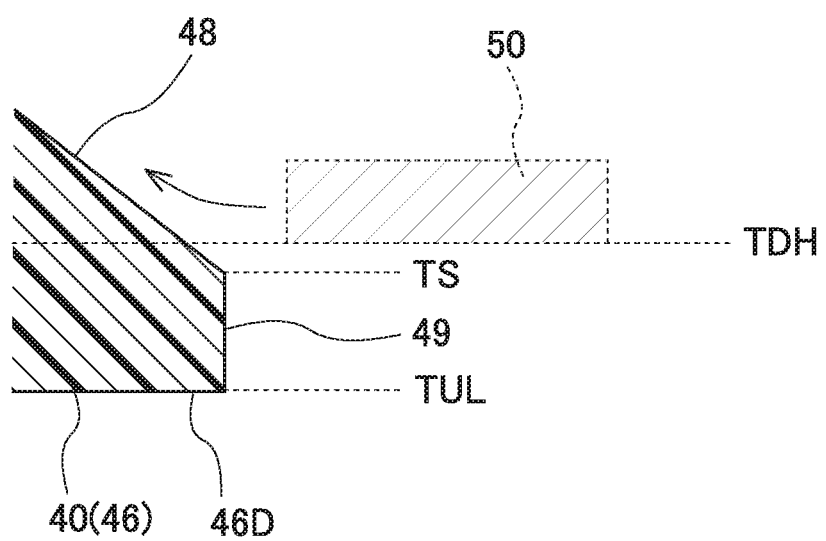
FIG. 8 is an enlarged cross-sectional view of a major part in a lid with which an accommodator is equipped, and to which the present sliding lid construction according to Second Modified Embodiment is applied.

Moreover, the above-described present sliding lid device 1 according to Embodiment comprises the upper-side lid member 40 including not only the upper-side comb-shaped portion 45 formed on the bottom face but also the inclined-face portion 45 provided on a more leading side in the backward sliding direction "Yb" than a position at which the upper-side comb-shaped portion 45 is made. That is, the upper-side lid member 40 is constructed to include the upper-side comb-shaped portion 45 and inclined-face portion 48 that are made at different sites independently of one another. However, the present invention is not limited to the thus constructed present sliding lid construction 1 at all. For example, the upper-side lid member 40 is also satisfactorily constructed to include the upper-side comb-shaped portion 45 and inclined-face portion 48 that are made at an identical site with one another. That is, the inclined-face portion 48 even adequately has a bottom end which is formed of at least some of the protrusions 46 in the upper-side comb-shaped portion 45, and whose height position "TS" is below the height position "TDH" that the placement portion 33 of the lower-side lid member 33 has, as shown in FIG. 8. Note that the height position "TS" also satisfactorily coincides with the height position "TUH" that the protrusions 46 have at the bottom end face 46D.

The present sliding lid construction 1 according to above-described Second Modified Embodiment comprises the upper-side lid member 40 including the inclined-face portion 48 that is provided with the upper-side comb-shaped portion 45 in which the protrusions 46 and depressions 47 are formed alternately in the width direction "X." Moreover, the width dimension between the protrusions 46 in the upper-side comb-shaped portion 45 is smaller in the width direction "X" than the minimum width dimension that the object 50 has, because the depressions 47 in the upper-side comb-shaped portion 45 have the width dimension "WUH" in the width direction "X" that is smaller than the minimum width dimension of the object 50 as described above. Consequently, the present sliding lid construction 1 according to Second Modified Embodiment comprises the upper-side lid member 40 including the upper-side comb-shaped portion 45 whose protrusions 46 have an end face (namely, the end face in the inclined-face portion 48) on the leading side in the backward sliding direction "Yb," end face which surely comes in contact with the object 50 placed on the placement portion 33 of the lower-side lid member 30 when the object 50 arrives relatively at the leading-side end of the upper-side lid member 40 in the direction. Therefore, the upper-side comb-shaped portion 45 allows securely prohibiting the object 50 from being put or held in the clearance occurring between the upper-side lid member 40 and the lower-side lid member 30 in the up/down direction "Z"; and accordingly permits securely prohibiting the object 50 from making its way further into any space occurring between them in the up/down direction "Z"; during the opening operation of the present sliding lid construction 1 according to Second Modified Embodiment.

Moreover, the present sliding lid construction 1 according to Second Modified Embodiment, which comprises the upper-side lid member 40 including the upper-side comb-shaped portion 45 provided with the inclined-face portion 48, transfers the object 50, which securely gets onto the inclined-face portion 48, to the placement portion 43 of the upper-side lid member 40 after the object 50 comes in contact with the end face of the protrusions 46 in the upper-side comb-shaped portion 45 (namely, the end face in the inclined-face portion 48) on the leading side in the backward sliding direction "Yb" during the opening operation. Therefore, the upper-side lid member 40 including the upper-side comb-shaped portion 45 allows preventing the present sliding lid construction 1 from operating faultily during the opening operation, because the upper-side comb-shaped portion 45 allows securely prohibiting the object 50 placed on the placement portion 33 of the lower-side lid member 30 from being put or held in the clearance occurring between the upper-side lid member 40 and the lower-side lid member 30 in the up/down direction "Z"; and accordingly permits the object 50 to take shelter on the placement portion 43 of the upper-side lid member 40 (or forward feeding it in the forward sliding direction "Yf").

In addition, the present sliding lid construction 1 according to Second Modified Embodiment comprises the upper-side lid member 40 including the inclined-face portion 48 whose bottom end also satisfactorily has the height position "TS" coinciding with the height position "TUL" that the protrusions 46 of the upper-side lid member 40 have at the bottom end face 46D. Alternatively, as illustrated in FIG. 8, the height position "TS" is even adequately located above the height position "TUL" that the protrusions 46 of the upper-side lid member 40 have at the bottom end face 46D. That is, the upper-side lid member 40 not only includes the inclined-face portion 48, but also has an end face 49 connected integrally with the bottom end of the inclined-face portion 45. The end face 49, which is satisfactorily made of an upright face whose normal is directed in the substantially horizontal direction, adequately constitutes the protrusions 46 of the upper-side lid member 40.

Having now fully described the present invention, it will be apparent to one of ordinary skill in the art that many changes and modifications can be made thereto without departing from the spirit or scope of the present invention as set forth herein including the appended claims.

What is claimed is:

1. A sliding lid construction comprising:
    an upper-side lid member and a lower-side lid member, at least one of the upper-side lid member and lower-side lid member sliding in a horizontal sliding direction to serve as a lid for accommodator, thereby turning a first relative positional relationship between the upper-side lid member and the lower-side lid member at an open position, at which the upper-side lid member and lower-side lid member overlap one another in an up/down direction, into a second relative positional relationship between the upper-side lid member and the lower-side lid member at a close position, at which the upper-side lid member and lower-side lid member separate away from one another horizontally, releasing the upper-side lid member and lower-side lid member from an overlap therebetween in the up/down direction, or vice versa;
    the lower-side lid member including: a lower-side comb-shaped portion provided with lower-side upward protrusions protruding upward from a top face thereof and lower-side downward depressions depressing downward, the lower-side upward protrusions and lower-side downward depressions formed one after another in succession alternately in a horizontal width direction crossing the sliding direction perpendicularly; and a placement portion formed to be capable of placing an article on a top face thereof;
    the upper-side lid member including: an upper-side comb-shaped portion capable of engaging with the lower-side comb-shaped portion, and provided with upper-side downward protrusions protruding downward from a bottom face thereof and upper-side upward depressions depressing upward, the upper-side downward protrusions and upper-side upward depressions formed one after another in succession alternately in the horizontal width direction; and an inclined-face portion formed at one of opposite ends thereof in the sliding direction, and having a face formed at an acute angle so as to be directed upward obliquely to the sliding direction.

2. The sliding lid construction according to claim 1, wherein the placement portion has a height position that is above a height position that the upper-side downward protrusions of the upper-side lid member have at a downward-directed bottom end face thereof.

3. The sliding lid construction according to claim 1, wherein each of width dimensions, which the lower-side downward depressions and upper-side upward depressions have in the width direction, is smaller than a minimum width dimension that the article, as a targeted object, has.

4. The sliding lid construction according to claim 1, wherein:
    the lower-side comb-shaped portion includes the lower-side upward protrusions and lower-side downward depressions each of which is formed so as to extend linearly in the sliding direction; and
    the placement portion is formed of an upward-directed top end face that the lower-side upward protrusions have.

5. The sliding lid construction according to claim 1, wherein the upper-side lid member further includes a horizontally-spreading horizontal base portion with a bottom face disposed at an end on one of opposite sides thereof in the sliding direction, and includes the upper-side downward protrusions formed so as to protrude downward from the bottom face.

6. The sliding lid construction according to claim 1, wherein:
    the inclined-face portion has a bottom end formed of at least some of the upper-side downward protrusions; and
    the bottom end of the inclined-face portion has a height position that is below a height position that the placement portion of the lower-side lid member.

7. The sliding lid construction according to claim 1, wherein the upper-side lid member includes the upper-side comb-shaped portion provided partially in the sliding direction.

8. The sliding lid construction according to claim 1, wherein the upper-side lid member includes the upper-side comb-shaped portion provided entirely in the sliding direction.

9. The sliding lid construction according to claim 1, wherein the upper-side lid member includes the upper-side comb-shaped portion and inclined-face portion that are made at different sites independently of one another in the sliding direction.

10. The sliding lid construction according to claim 1, wherein the upper-side lid member includes the upper-side comb-shaped portion and inclined-face portion that are made at an identical site with one another in the sliding direction, thereby providing the inclined-face portion with the upper-side comb-shaped portion.

11. The sliding lid construction according to claim 10, wherein the upper-side lid member has an end face whose normal is substantially parallel to the horizontal sliding direction, thereby giving the inclined-face portion a first height position at a bottom end thereof, the first height position located above a second height position that the protrusions of the upper-side comb-shaped portion have at a bottom end face thereof.

12. The sliding lid construction according to claim 1, wherein the upper-side lid member includes the inclined-face portion whose face is formed at an acute angle falling in a range of from 30 to 60 degrees.

* * * * *